Figure 1:
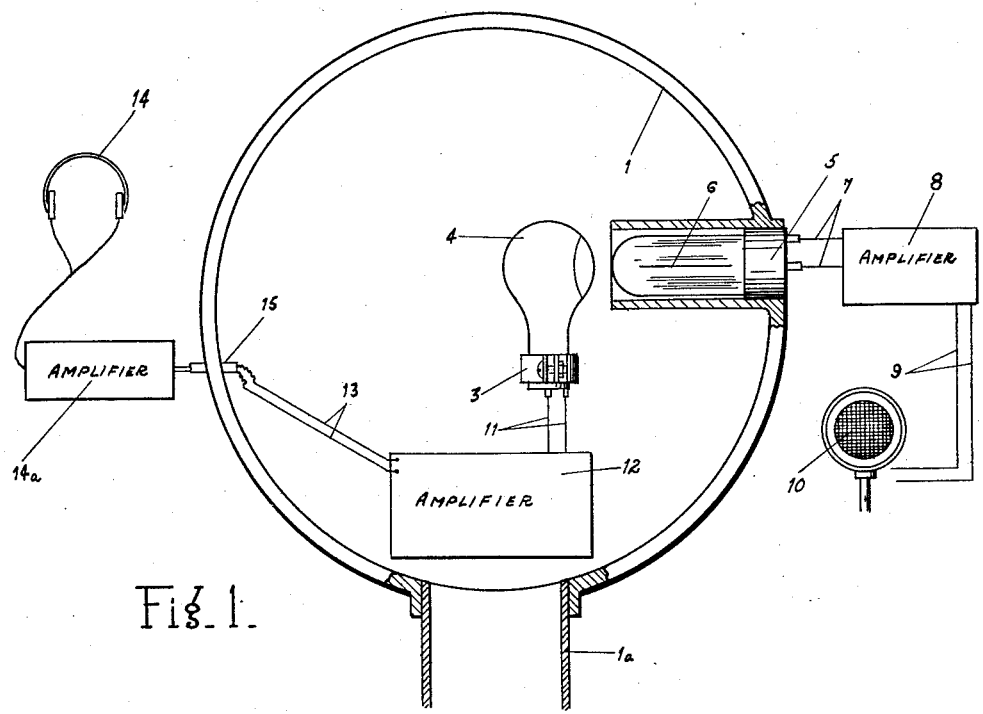

April 19, 1932.  F. H. OWENS  1,854,715

LIGHT TESTING DEVICE

Filed Sept. 9, 1929

INVENTOR.
FREEMAN H. OWENS

BY *Philip S. Hopkins*
ATTORNEY.

Patented Apr. 19, 1932

1,854,715

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

LIGHT TESTING DEVICE

Application filed September 9, 1929. Serial No. 391,381.

This invention relates to improvements in light testing devices, the object of the invention being to provide a device of this character which is particularly adapted for testing reproducing lamps or photo-electric cells such as are employed in the reproduction of photographic sound records, and which device is simple in construction, compact and efficient in operation.

Other objects and advantages of the invention will appear as the description proceeds.

Figure 2:
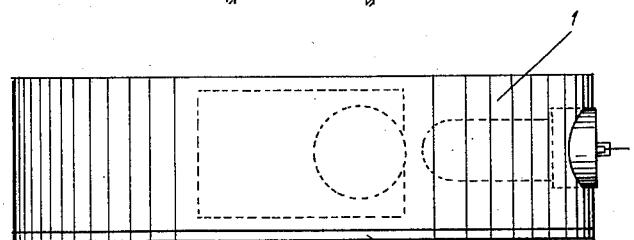

In the drawings accompanying this specification,

Figure 1 is a diagrammatic, partly sectional side view of a device embodying the features of the present invention; and Figure 2 is a plan view of the housing of said device.

Referring to the drawings, 1 designates a light-tight housing, preferably of cylindrical form and provided with a removable cover or lid 2. For convenience in supporting the housing on a suitable stand, the housing is illustrated herein having a sleeve 1a extending radially from its circumference. Within the housing is disposed an adjustable holder 3 adapted to receive a photo-electric cell 4. The housing carries in its cylindrical wall a lamp holder 5, in which may be supported a lamp 6 which may be of the type used for recording photographic sound records extending within the housing to a point in close proximity to the window of the photo-electric cell 4. The lamp 6 is connected by wires 7 with the output of an amplifier 8, the input of which is connected by wires 9 with a microphone 10, or other sound source, whereby the intensity of the lamp is varied in accordance with the sound originating at the microphone. The photo-electric cell 4 is connected by wires 11 with the input of an amplifier 12 disposed within the housing, the output of which amplifier is connected by wires 13 with a pair of head phones 14, the circuit passing through an additional amplifier 14a outside said housing, or with a loud speaker if desired, disposed outside of the housing, said wires passing through a sleeve 15 mounted in the wall of the housing.

It is desirable that the amplifier 12 provide at least one stage of amplification. Such amplifiers are common and well known, and therefore a detail description thereof is deemed unnecessary herein.

With the device above described, a lamp to be tested is mounted in the holder 5 and a photo electric cell which is known to be in good condition is placed in the holder 3. Sound is then produced at the microphone thereby to vary the intensity of the lamp, which variations are caught by the cell and transmitted through the amplifier 12 to the head phones or other receiving instrument. An operator listening in at such instrument can thus readily determine whether the reproduced sounds are of such volume and quality as to indicate that the lamp 6 is suitable for use. Photo-electric cells may similarly be tested, by inserting a lamp 6, which is known to be in good condition and inserting a photo electric cell to be tested in holder 3. The listener in, knowing that the lamp is in good condition, may judge of the condition of the cell by the quality of the reproduced sounds.

I claim:—

1. A light testing device, comprising in combination, a housing, means accessible from the outside of said housing for supporting a lamp within said housing, sound receiving means associated with said lamp for varying the intensity thereof, means for supporting a light sensitive element within the housing in position to receive light rays from said lamp and translate them into electrical impulses, and means associated with said light sensitive element for amplifying and rendering audible said electrical impulses.

2. A light testing device, comprising in combination, a housing, means accessible from the outside of said housing for supporting a lamp within said housing, a sound source disposed outside of said housing, an amplifier in operative connection with said sound source and lamp for varying the intensity of the lamp, means for supporting a light sensitive element within the housing in position to receive light rays from said lamp and translate them into electrical impulses, an amplifier disposed within the housing in operative connection with said light sensitive element for receiving said electrical impulses, and means disposed outside the housing and connected with said amplifier for rendering audible said electrical impulses.

3. A light testing device, comprising in combination, a light-tight housing having a removable cover, means, accessible from the outside of said housing for supporting a lamp within said housing, sound-receiving means associated with said lamp for varying the intensity thereof, means for supporting a light-sensitive element within the housing in position to receive light rays from said lamp and translate them into electrical impulses and means associated with said light sensitive element for amplifying and rendering audible said electrical impulses.

In testimony whereof, I affix my signature.

FREEMAN H. OWENS.